United States Patent
Nicolich-Henkin et al.

(10) Patent No.: US 11,354,089 B2
(45) Date of Patent: Jun. 7, 2022

(54) SYSTEM AND METHOD FOR DIALOG INTERACTION IN DISTRIBUTED AUTOMATION SYSTEMS

(71) Applicant: Robert Bosch GmbH, Stuttgart (DE)

(72) Inventors: Leah Nicolich-Henkin, Pittsburgh, PA (US); Cory Henson, Pittsburgh, PA (US); Joao P. Sousa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 1105 days.

(21) Appl. No.: 15/374,595

(22) Filed: Dec. 9, 2016

(65) Prior Publication Data

US 2018/0165061 A1 Jun. 14, 2018

(51) Int. Cl.
*G06F 3/16* (2006.01)
*H04L 12/28* (2006.01)
*G10L 13/00* (2006.01)

(52) U.S. Cl.
CPC ............ *G06F 3/167* (2013.01); *H04L 12/282* (2013.01); *H04L 12/2827* (2013.01); *G10L 13/00* (2013.01)

(58) Field of Classification Search
CPC ............ G10L 13/00; G05B 2219/2642; G05B 19/042; G05B 19/048; G05B 2219/2614; G05B 11/32; H04L 12/2816; H04L 12/282; H04L 12/2827; Y02B 70/3266; Y04S 20/242; G06F 3/167
See application file for complete search history.

(56) References Cited

U.S. PATENT DOCUMENTS

| | | | | |
|---|---|---|---|---|
| 2001/0041980 | A1* | 11/2001 | Howard | G10L 15/1822 704/270 |
| 2008/0133812 | A1* | 6/2008 | Kaiser | G06F 9/542 710/263 |
| 2008/0312754 | A1* | 12/2008 | Nielsen | G05B 19/0421 700/7 |
| 2011/0301958 | A1* | 12/2011 | Brush | G06F 9/451 704/275 |

(Continued)

OTHER PUBLICATIONS

David Adamson and Carolyn Penstein Rose. Coordinating multi-dimensional support in collaborative conversational agents. http://www.cs.cmu.edu/~dadamson/pubs/bazaarITS2012.pdf (6 pages).

(Continued)

*Primary Examiner* — Tadesse Hailu
(74) *Attorney, Agent, or Firm* — Maginot, Moore & Beck LLP

(57) ABSTRACT

A method for generating a user interface with a user interface device in a distributed automation system includes receiving a service message from a home automation device in the distributed automation system, identifying a state of a dialog manager of the user interface device in response to receiving the service message, and generating a natural language output message based at least in part on a device identifier parameter in the service message and a plurality of natural language templates stored in the memory in response to the dialog manager being in an idle state. The method further includes storing the service message in a priority queue in the memory based on a priority level parameter corresponding to the service message in response to the dialog manager being in an active state.

16 Claims, 4 Drawing Sheets

(56) References Cited

U.S. PATENT DOCUMENTS

| | | | | |
|---|---|---|---|---|
| 2013/0096965 | A1* | 4/2013 | Pappas | G06Q 10/02 |
| | | | | 705/5 |
| 2014/0108019 | A1* | 4/2014 | Ehsani | G10L 21/06 |
| | | | | 704/275 |
| 2015/0066479 | A1* | 3/2015 | Pasupalak | G06F 17/27 |
| | | | | 704/9 |
| 2015/0109122 | A1* | 4/2015 | Stern | G08B 27/008 |
| | | | | 340/539.1 |
| 2015/0276254 | A1* | 10/2015 | Nemcek | G05B 15/02 |
| | | | | 700/278 |
| 2015/0312341 | A1* | 10/2015 | Smith | H04N 5/781 |
| | | | | 709/213 |
| 2015/0331851 | A1* | 11/2015 | Poli | G06N 5/02 |
| | | | | 704/9 |
| 2015/0365787 | A1* | 12/2015 | Farrell | H04W 4/02 |
| | | | | 455/456.1 |
| 2016/0336024 | A1* | 11/2016 | Choi | G10L 15/22 |
| 2016/0364114 | A1* | 12/2016 | Von Dehsen | H04L 12/2807 |
| 2016/0378080 | A1* | 12/2016 | Uppala | G10L 15/22 |
| | | | | 700/275 |
| 2017/0064412 | A1* | 3/2017 | Taxier | H04N 21/8133 |
| 2017/0191693 | A1* | 7/2017 | Bruhn | F24F 11/30 |
| 2017/0357637 | A1* | 12/2017 | Nell | G06F 17/279 |

OTHER PUBLICATIONS

Alyssa E Andrews, Raj M Ratwani, and J Gregory Trafton. The effect of alert type to an interruption on primary task resumption. In Proceedings of the HFES Annual Meeting 2009. Citeseer, 2009.

Srinivas Bangalore, Giuseppe Di Fabbrizio, and Amanda Stent. Learning the structure of task-driven human-human dialogs. Audio, Speech, and Language Processing, IEEE Transactions on, 16(7):1249-1259, 2008.

Benjamin S Bloom. The 2 sigma problem: The search for methods of group instruction as effective as one-to-one tutoring. Educational researcher, pp. 4-16, 1984.

Dan Bohus and Alexander I Rudnicky. The ravenclaw dialog management framework: Architecture and systems. Computer Speech & Language, 23(3):332-361, 2009.

Jin Cheng and Thomas Kunz. A survey on smart home networking. Carleton University, Systems and Computer Engineering, Technical Report, SCE-09-10, 2009.

James Fogarty, Scott E Hudson, Christopher G Atkeson, Daniel Avrahami, Jodi Forlizzi, Sara Kiesler, Johnny C Lee, and Jie Yang. Predicting human interruptibility with sensors. ACM Transactions on Computer-Human Interaction (TOCHI), 12(1):119-146, 2005.

Eun Young Ha, Christopher M Mitchell, Kristy Elizabeth Boyer, and James C Lester. Learning dialogue management models for task-oriented dialogue with multiple communicative channels. In Proceedings of the 14th Annual SIGDIAL Meeting on Discourse and Dialogue, pp. 204-213, 2013.

Scott Hudson, James Fogarty, Christopher Atkeson, Daniel Avrahami, Jodi Forlizzi, Sara Kiesler, Johnny Lee, and Jie Yang. Predicting human interruptibility with sensors: a wizard of oz feasibility study. In Proceedings of the SIGCHI conference on Human factors in computing systems, pp. 257-264. ACM, 2003.

[Wei Jin, Albert Corbett, Will Lloyd, Lewis Baumstark, and Christine Rolka. Evaluation of guided-planning and assisted-coding with task relevant dynamic hinting. In Intelligent Tutoring Systems, pp. 318-328. Springer, 2014.

Hieke Keuning, Bastiaan Heeren, and Johan Jeuring. Strategy-based feedback in a programming tutor. Department of Information and Computing Sciences. Utrecht University, Utrecht, The Netherlands. Nov. 2014. (14 pages).

Su Nam Kim, Lawrence Cavedon, and Timothy Baldwin. Classifying dialogue acts in one-on-one live chats. In Proceedings of the 2010 Conference on Empirical Methods in Natural Language Processing, pp. 862-871. Association for Computational Linguistics, 2010.

Amruth N Kumar. A model for deploying software tutors. In IEEE 6th International Conference on Technology for Education (T4E), Amritapuri, India, pp. 3-9, 2014.

Shiu Kumar. Ubiquitous smart home system using android application. International Journal of Computer Networks & Communications (IJCNC) vol. 6, No. 1, Jan. 2014.

H Chad Lane and Kurt VanLehn. Teaching the tacit knowledge of programming to noviceswith natural language tutoring. Computer Science Education, 15(3):183-201, 2005.

Carsten Magerkurth, Richard Etter, Maddy Janse, Julia Kela, Otilia Kocsis, and Fano Ramparany. An intelligent user service architecture for networked home environments. (10 pages) , May 7-12, 2011.

Simon Mayer, Andreas Tschofen, Anind K Dey, and Friedemann Mattern. User interfaces for smart things—a generative approach with semantic interaction descriptions. Institute for Pervasive Computing, ETH Zurich HCI Institute, Carnegie Mellon University (32 pages), Apr. 4, 2014.

Marilyn R McGee-Lennon, Maria Wolters, and Tony McBryan. Audio reminders in the home environment. 2007. Proceedings of the 13th International Conference on Auditory Display, Montreal, Canada, Jun. 26-29, 2007.

Marilyn Rose McGee-Lennon, Maria Klara Wolters, and Stephen Brewster. User-centred multimodal reminders for assistive living. In Proceedings of the SIGCHI Conference on Human Factors in Computing Systems, pp. 2105-2114. ACM, 2011.

Sarah Mennicken, Jo Vermeulen, and Elaine M Huang. From today's augmented houses to tomorrow's smart homes: new directions for home automation research. In Proceedings of the 2014 ACM International Joint Conference on Pervasive and Ubiquitous Computing, pp. 105-115. ACM, 2014.

Sebastian Möller, Jan Krebber, Alexander Raake, Paula Smeele, Martin Rajman, Mirek Melichar, Vincenzo Pallotta, Gianna Tsakou, Basilis Kladis, Anestis Vovos, et al. Inspire: Evaluation of a smarthome system for infotainment management and device control. Proceedings of the LREC 2004 international conference, May 26-28, 2004, Lisbon, Portugal. pp. 1603-1606.

Tadashi Okoshi, Julian Ramos, Hiroki Nozaki, Jin Nakazawa, Anind K Dey, and Hideyuki Tokuda. Reducing users' perceived mental effort due to interruptive notifications in multi-device mobile environments. In Proceedings of the 2015 ACM International Joint Conference on Pervasive and Ubiquitous Computing, pp. 475-486. ACM, 2015.

Antti Oulasvirta, K-P Engelbrecht, Anthony Jameson, and Sebastian Moller. Communication failures in the speech-based control of smart home systems. In Intelligent Environments, 2007. IE 07. 3rd IET International Conference on, pp. 135-143. IET, 2007.

Andrei Papancea, Jaime Spacco, and David Hovemeyer. An open platform for managing short programming exercises. In Proceedings of the ninth annual international ACM conference on International computing education research, pp. 47-52. ACM, 2013.

Celeste Lyn Paul, Anita Komlodi, and Wayne Lutters. Again?!! the emotional experience of social notification interruptions. In Human-Computer Interaction—INTERACT 2011, pp. 471-478. Springer, 2011.

Celeste Lyn Paul, Anita Komlodi, and Wayne Lutters. Interruptive notifications in support of task management. International Journal of Human-Computer Studies, 79:20-34, 2015.

Shinpei Soda, Mitsutoshi Nakamura, Shinichi Matsumoto, Shintaro Izumi, Hitoshi Kawaguchi, and Masahiko Yoshimoto. Implementing virtual agent as an interface for smart home voice control. In Software Engineering Conference (APSEC), 2012 19th Asia-Pacific, vol. 1, pp. 342-345. IEEE, 2012.

Leigh Ann Sudol-DeLyser. Expression of abstraction: Self explanation in code production. In Proceedings of the 46th ACM Technical Symposium on Computer Science Education, pp. 272-277. ACM, 2015.

Cristen Torrey, Susan Fussell, and Sara Kiesler. How a robot should give advice. In Proceedings of the 8th ACM/IEEE international conference on Human-robot interaction, pp. 275-282. IEEE Press, 2013.

Martijn H Vastenburg, David V Keyson, and Huib De Ridder. Considerate home notification systems: a field study of acceptability

(56) References Cited

OTHER PUBLICATIONS of notifications in the home. International Journal of Human-Computer Studies 67 (2009) 814-826.

David Warnock, Marilyn R McGee-Lennon, and Stephen Brewster. The impact of unwanted multimodal notifications. In Proceedings of the 13th international conference on multimodal interfaces, pp. 177-184. ACM, 2011.

Joseph B Wiggins, Kristy Elizabeth Boyer, Alok Baikadi, Aysu Ezen-Can, Joseph F Grafsgaard, Eun Young Ha, James C Lester, Christopher M Mitchell, and Eric N Wiebe. Javatutor: An intelligent tutoring system that adapts to cognitive and affective states during computer programming. In Proceedings of the 46th ACM Technical Symposium on Computer Science Education, pp. 599-599. ACM, 2015.

Earl Hunt, Nancy Frost, and Clifford Lunneborg. Individual differences in cognition: A new approach to intelligence. The psychology of learning and motivation, 7:87-122, 1973.

* cited by examiner

SYSTEM AND METHOD FOR DIALOG INTERACTION IN DISTRIBUTED AUTOMATION SYSTEMS

FIELD

This disclosure relates generally to the field of home automation systems and, more specifically, to user interfaces for distributed home automation systems.

BACKGROUND

Home automation systems provide various services to occupants of a house including, but not limited to, convenience, security, and increased efficiencies that reduce power and water consumption in a house. Prior art home automation systems often rely upon a centralized control system that exercises direct control over a limited set of devices within a house. Some prior art home automation systems integrate a speech recognition interface to receive commands from an occupant of the house.

Recently, many so-called "smart" devices for home automation have appeared for sale. The "smart" devices include computerized home automation systems that control various aspects of the home and communicate with a user via a digital network such as a wired or wireless local area network in a home. Well-known examples of "smart" home automation devices include, for example, networked home surveillance and security systems, networked thermostats, and "smart" appliances that can communicate with the user via the network. Unlike traditional centralized home automation systems, the smart devices form a distributed network in existing houses and do not require a centralized control system.

One disadvantage of the distributed nature of the smart devices is that these systems often operate in an uncoordinated manner that increases the complexity of using the distributed home automation system since the user typically must interact with each "smart" device separately. Furthermore, many smart devices operate using imperative control from the user, which is to say that the user must take the initiative to provide commands to the device using speech input or another suitable input method. The imperative command model may become cumbersome for a large number of home automation devices in a distributed home automation system. Consequently, improvements to distributed home automation systems to increase the efficiency of operation for multiple home automation devices would be beneficial.

SUMMARY

In one embodiment, a method for dialog interaction with a user interface device in a distributed automation system has been developed. The method includes receiving with a network interface device in a user interface device, a service message from a home automation device in the distributed automation system, identifying, with the processor, a state of a dialog manager that the processor executes with stored program instructions stored in a memory of the user interface device in response to receiving the service message, generating, with the processor and an output device, a natural language output message based at least in part on a device identifier parameter in the service message and a plurality of natural language templates stored in the memory in response to the dialog manager being in an idle state, and storing, with the processor, the service message in a priority queue in the memory based on a priority level parameter corresponding to the service message in response to the dialog manager being in an active state.

In another embodiment, a user interface device that implements dialog interaction in a distributed automation system has been developed. The user interface device includes a network interface device configured to receive service messages from a plurality of home automation devices, an output device, a memory, and a processor operatively connected to the network interface device, the output device, and the memory. The processor is configured to receive a service message from a home automation device in the distributed automation system with the network interface device, identify a state of a dialog manager that the processor executes with stored program instructions stored in the memory of the user interface device in response to receiving the service message, generate a natural language output message based at least in part on a device identifier parameter in the service message and a plurality of natural language templates stored in the memory in response to the dialog manager being in an idle state with the output device, and store the service message in a priority queue in the memory based on a priority level parameter corresponding to the service message in response to the dialog manager being in an active state.

DETAILED DESCRIPTION

For the purposes of promoting an understanding of the principles of the embodiments disclosed herein, reference is now made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "home automation device" includes any electrical or electromechanical device in a house that is configured to receive remote commands to perform a function in an automated manner. Examples of home automation devices include, but are not limited to, appliances including kitchen appliances and clothes washers and driers, automated light control systems, heating ventilation and air-conditioning (HVAC) systems, water heaters, home entertainment systems, alarm and home security systems, garage door openers, automated door and window locks, automated window shades, and the like.

As used herein, the term "service message" refers to a digital message that is transmitted from a home automation device to another computing device that is associated with a user to inform the user of information pertaining to operation of the home automation system. Service messages include, for example, status information from a home automation device, alarms, and requests for commands or other input from a user. As is described in more detail below, the computing device that is associated with the user processes service messages and presents synthesized speech prompts to selected service messages to the user based on the location and activity of the user and a priority level of the service message. As used herein, the term "command message" refers to a digital message that a computing device associated with a user transmits to a home automation device to control the operation of the home automation device. In some instances, the user provides speech input to the computing device in response to a service message. The computing device generates a command message based on the speech input of the user and transmits the command message to the home automation device to control the home automation device.

Figure 1:
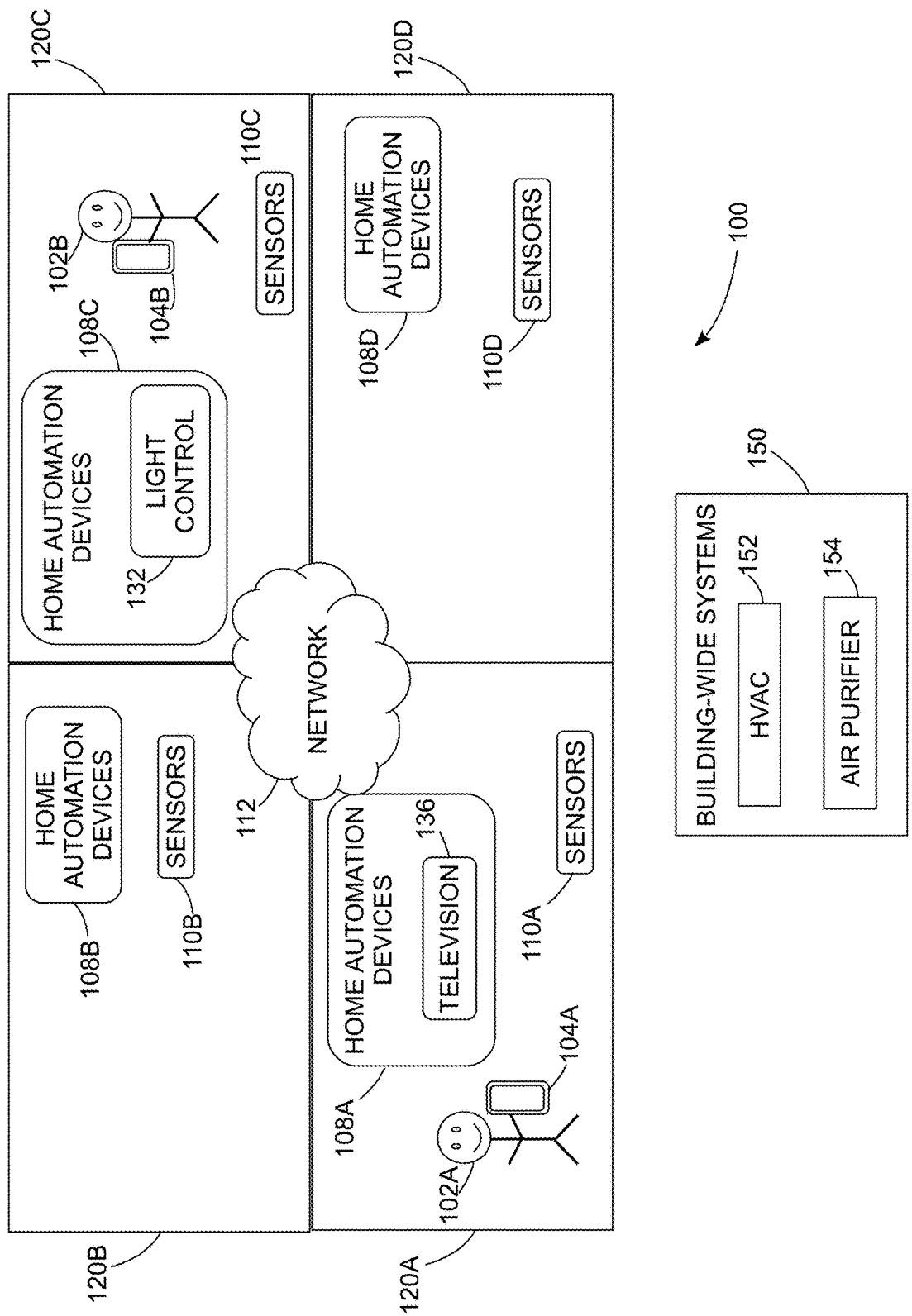
FIG. 1 is a schematic diagram of a home automation system that includes a distributed network of home automation devices.

FIG. 1 depicts a distributed home automation system 100. The system 100 includes a plurality of home automation devices 108A-108D that form a distributed home automation system that perform automated tasks in rooms 120A-120D of a house or other building. The home automation devices optionally include building-wide systems 150 such as an HVAC system 152 and an air purifier 154 that affect all of the rooms in the house. In the example of FIG. 1, the home automation devices 108C include a light controller 132 that adjusts the level of lighting in the room 120C. The system 100 also includes a television 136 in the room 120A. Those of skill in the art will recognize that FIG. 1 is an example of a distributed home automation system and that different houses will of course include different room layouts and combinations of home automation devices and sensors than are depicted in FIG. 1.

The system 100 further includes sensors 110A-110D that are positioned in the rooms 120A-120D of the house. The sensors 110A-110D include, for example, cameras, motion detectors, temperature sensors, audio sensors, and the like that monitor the conditions within each of the rooms 120A-120D, respectively. The sensors 110A-110D optionally detect the presence or absence of a human in each room and monitor the activities of the humans. In some embodiments the sensors 110A-110D are integrated with home automation devices 108A-108D while in other embodiments the sensors 110A-110D are separate from the home automation devices 108A-108D.

In the illustrative depiction of FIG. 1, two users 102A and 102B use user interface devices 104A and 104B, respectively, as interfaces to receive messages from the home automation devices 108A-108D as output prompts and to issue commands to the home automation devices 108A-108D. In one embodiment, the user interface devices 104A and 104B generate speech synthesized outputs, while in another embodiment the user interface devices 104A and 104B generate text outputs via a display screen. In the system 100, the user interface devices 104A and 104B are embodied as mobile electronic devices 104A and 104B that include, for example, smartphones, tablet computing devices, wearable computing devices, or any other computing device that is associated with a single user and kept in close proximity to the user during operation. As used herein, the term "user interface device" refers to a computerized device in a distributed home automation system that receives services messages from multiple home automation devices, such as the home automation devices 108A-108D, presents speech synthesized prompts to selected service messages to the user based on priority levels for the different messages and user preferences, and optionally receives speech input to generate command messages that control the operation of the home automation devices.

In the system 100, the home automation devices 108A-108D and the sensors 110A-110D are communicatively connected to the user interface devices 104A and 104B and optionally to each other via a data network 112. In the embodiment of FIG. 1 the network 112 is a local area network (LAN) that includes either or both of wired networks, such as Ethernet, and wireless networks such as wireless protocols in the IEEE 802.11 family of wireless network protocols. The network 112 enables network communication between any of the home automation devices 108A-108D, including the building-wide systems 150, and sensors 110A-110D with the user interface devices 104A and 104B at any location within the range of the network 112. In some embodiments, the user interface devices 104A and 104B also communicate directly with a set of the home automation devices 108A-108D and sensors 110A-110D within one of the rooms 120A-120D while the user interface device 104A/B is located in the one room using a short range radio protocol such as Bluetooth or a line of sight infrared or optical data connection. For example, in FIG. 1 the user interface device 104A can communicate with any of the home automation devices 108A-108D in the house via the network 112, but the user interface device 104A optionally connects to the home automation devices 108A and sensors 110A using the short-range line of sight networking device while being isolated from the remaining home automation devices 108B-108D and sensors 110B-110D.

As described in further detail below, in the home automation system 100 the home automation devices 108A-108D transmit service messages to the user interface devices 104A and 104B for the users 102A and 102B, respectively. The user interface devices execute software programs to track the location and activities of the users and to control the presentation of speech prompts to the users in response to service messages from the home automation devices 108A-108D. While the system 100 depicts mobile electronic user interface devices 104A and 104B that provide an interface to access the home automation system 100 for illustrative purposes, in an alternative embodiment a set of fixed-location appliance devices in each of the rooms 120A-120D implements the same user interface device functionality as the mobile electronic devices 104A and 104B.

Figure 3:
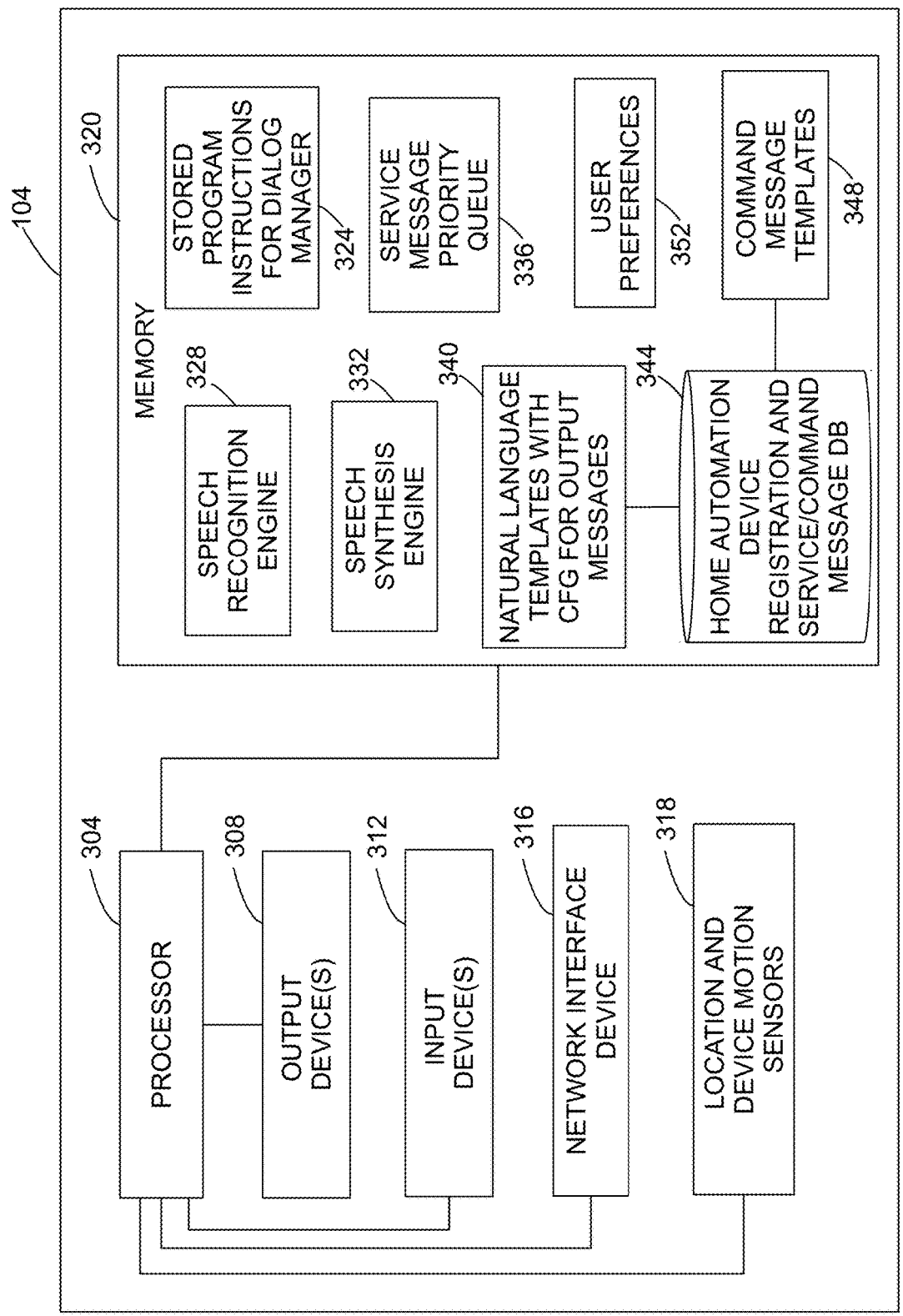
FIG. 3 is a schematic diagram of a computerized device that implements a dialog management system in the home automation system of FIG. 1 and the process of FIG. 2.

FIG. 3 is a schematic diagram of the configuration of the user interface devices 104A and 104B for operation in the system 100. FIG. 3 depicts a configuration of a single user interface device 104. The user interface device 104 includes a processor 304, output device 308, audio input device 312, at least one network interface device 316, one or more location and device motion sensors 318, and a memory 320. In one embodiment, the output device 308 is an audio output device that includes one or more speakers that are located in the user interface device 104 and optionally includes a wired or wireless connection to external speakers that are positioned in at least one room 120A-120D of the house. In another embodiment, the output device 308 is a visual display device that presents text or graphical outputs to the user via a display that is built into each of the user interface devices 104A and 104B or through an external display device that is connected to one of the user interface devices via a wired or wireless connection. The input devices 312 includes one or more audio input devices or manual input devices such as keyboards, touchscreens, gesture input devices, and the like. Audio input devices include, for example, microphones that are either located in the user interface device 104 or are connected to the user interface device 104 through a wired or wireless connection. Many practical embodiments of the user interface device 104 include multiple input devices 312, such a speech input and touchscreen input device, and multiple output devices 308, such as a visual display device and one or more audio output devices. The network interface device 316 includes, for example, a wireless local area network (WLAN) transceiver such as a transceiver that implements the IEEE 802.11 family of protocols to access the network 112. In some embodiments, the network interface device 316 further includes point to point wireless devices such as Bluetooth or optical/infrared transceivers that communicate directly with home automation devices that are located within a short range (e.g. in the same room) as the user interface device 104. The location and device motion sensors 318 are configured for monitoring the location and movement of the user interface device 104 within an indoor setting such as a house or other building. For example, in one embodiment the network interface device 316 identifies short range wireless access points or other wireless transmitter beacons that can be detected by the user interface device in various locations within different rooms. The device motion sensors include accelerometers and gyroscopes that monitor both the location and movement of the user interface device 104, which corresponds to the locations and movement of the user who carries the user interface device 104.

The processor 304 includes, for example, a central processing unit (CPU) with one or more processing cores, a graphics processing unit (GPU), and digital signal processors (DSPs) that assist in processing audio input data from the audio input device 312 and in the generation of synthesized speech output and other audio through the audio output device 308. In many embodiments the processor 304 includes multiple digital processing devices that are integrated into a System on a Chip (SoC) configuration. While not expressly depicted in FIG. 3, some embodiments of the user interface device further include an integrated graphical display device with a touch input interface such as an LCD or organic LED touchscreen display that can be used in conjunction with the audio output device 308 and audio input device 312.

The memory 320 includes one or more digital data storage devices with a typical embodiment including a non-volatile solid state storage device such as NAND flash memory and volatile data storage devices such as a random access memory (RAM). The memory 320 holds stored program instructions 324 that implement the functionality described below in FIG. 2 and FIG. 4, a speech recognition engine 328, a speech synthesis engine 332, a priority queue 336 that stores service messages that are awaiting presentation to the user via the dialog manager 324, predetermined natural language templates 340, a home automation device registration and service and command message database 344, predetermined command message templates 348, and user preference data 352.

In the user interface device 104, the speech recognition engine 328 is, for example, a software program that implements a lower-level acoustic model and a higher-level language model to recognize spoken input from the user. The acoustic model extracts individual sounds and phonemes from the digital audio data received from the audio input device 312. The language model identifies sequences of words from the phoneme data received from the acoustic model and generates a machine readable set of words in a natural language (e.g. English) based on the speech input. Examples of acoustic and language models include, for example, hidden Markov models, support vector machines, neural networks, and the like.

In the user interface device 104, the speech synthesis engine 332 generates digital audio data that encodes a machine-generated audio output for a set of words in a natural language such as English. Examples of digital audio output data include a pulse code modulated (PCM) signal that the processor 304 uses to generate an analog output signal to drive the audio output device 308, although in some embodiments the user interface device 104 transmits compressed digital audio data to an external audio playback device in the system 100. Speech synthesis engines are otherwise well known to the art and are not described in further detail herein.

In one embodiment of the user interface device 104, the home automation device registration data and service/command message database 344 stores specific registration data that enables the user interface device 104 to provide a speech based user interface to the user for a wide range of home automation devices including the home automation devices 108A-108D that are depicted in FIG. 1. In particular, the database 344 includes a registration of specific hardware identifiers such as media access control (MAC) addresses, serial numbers, or other identifiers that specifically identify a particular home automation device and the specific locations of each home automation device within the house. For example, the database 344 stores a specific identifier and location information for the light control device 132 that associates the light control device with the room 120C. The processor 304 uses the registration database 344 to distinguish the light controller 132 from another light control device in another room of the house that may have an otherwise identical hardware configuration.

In another embodiment, the user interface device 104 does not store a predetermined database of registration data for different home automation devices in the system 100. Instead, the system 100 utilizes peer-to-peer, ad-hoc, publish-subscribe network for communication between the home automation devices 108A-108D using the network 112. With this network, home automation device registration with the user interface device 104A or 104B is unnecessary. Instead, the service messages are broadcast into the network 112 and received by the user interface device 104. The messages can be targeted to devices within a particular location (e.g. a particular room) through a technology called semantic addressing to identify the location of the particular home automation device and optionally target a particular user interface device, such as either the user interface device 104A or 104B. These service messages contain the address/identifier of the sending device. Using this address, the corresponding user interface device 104 responds directly with a command message. In addition, a device/service discovery query may discover devices/services within a particular location when necessary.

In the user interface device 104, the device registration database 344 also includes a registry of the service messages that are received from a particular home automation device and the command messages that the user interface device 104 sends to the home automation device to control the operation of the home automation device. The service messages and command messages are specific to each registered home automation device and are typically stored in a machine-readable packet or message format within the database 344.

The registration database 344 also maps specific service messages to specific natural language templates 340. The natural language templates 340 provide the structure required for the dialog manager in the user interface device 104 to generate a natural language output, such as a text or speech synthesized prompt, for the user based on the contents of specific service messages from a home automation device. In one embodiment of the user interface device 104, the memory stores the natural language templates 340 including a context-free grammar (CFG) data structure that includes a stored grammar for a natural language (e.g. English). In the user interface device 104, the processor 304 uses the context-free grammar to generate natural language templates that include some words from the grammar that form an understandable structure, such as a sentence. In some embodiments, the processor 304 uses the context-free grammar to generate new outputs for certain interactions to provide variability in the structure of the natural language output sentences. The processor 304 uses the parameters that are received in the service messages from the home automation devices, such as a device identifier parameter such as a MAC address or hardware serial number, to identify sets of natural language templates that correspond to different service messages. Some terms in the natural language templates correspond to data parameters that vary based on the contents of a particular service message. For example, one template includes a temperature parameter element that represents a numeric temperature value that is encoded in the machine-readable service message, which the processor 304 populates with the corresponding value from the service message. The user interface device 104 selects the template to report the temperature based on the device identifier parameter for the thermostat received in the service message and based on the predetermined temperature parameter data contained within a service message that reports the temperature.

The registration database 344 also maps specific command message templates 348 to specific command messages for a home automation device. The command templates include the specific structures of machine-readable command instructions that correspond to specific command messages that the user interface device 104 transmits to the home automation devices 108A-108D. The specific structure of each command message template varies based on the specific protocol that each of the home automation devices 108A-108D uses to receive commands. Many of the command message templates 348 also include variable parameters that the processor 304 populates using data received from the user via the interactions with the dialog manager 324. For example, a command template that instructs the HVAC system 152 to change the temperature setpoint for the thermostat includes a parameter for the temperature that the user interface device 104 receives from the user during interactions with the dialog manager 324. The dialog manager 324 extracts the set temperature parameter from the user input and populates the corresponding command message template 348. The natural language templates 340 enable conversion of information from service messages into natural language formats that are suitable for output to the human user while the command message templates 348 enable conversion of input data from the human user to a machine-readable command message format that is compatible with a corresponding home automation device. Thus, the user interface device 104 uses the registration database 344, natural language templates 340, and command input templates 348 to identify specific home automation devices and to provide a unified speech output/input interface to the user for a wide range of home automation devices including the home automation devices 108A-108D that are depicted in FIG. 1.

Figure 4:
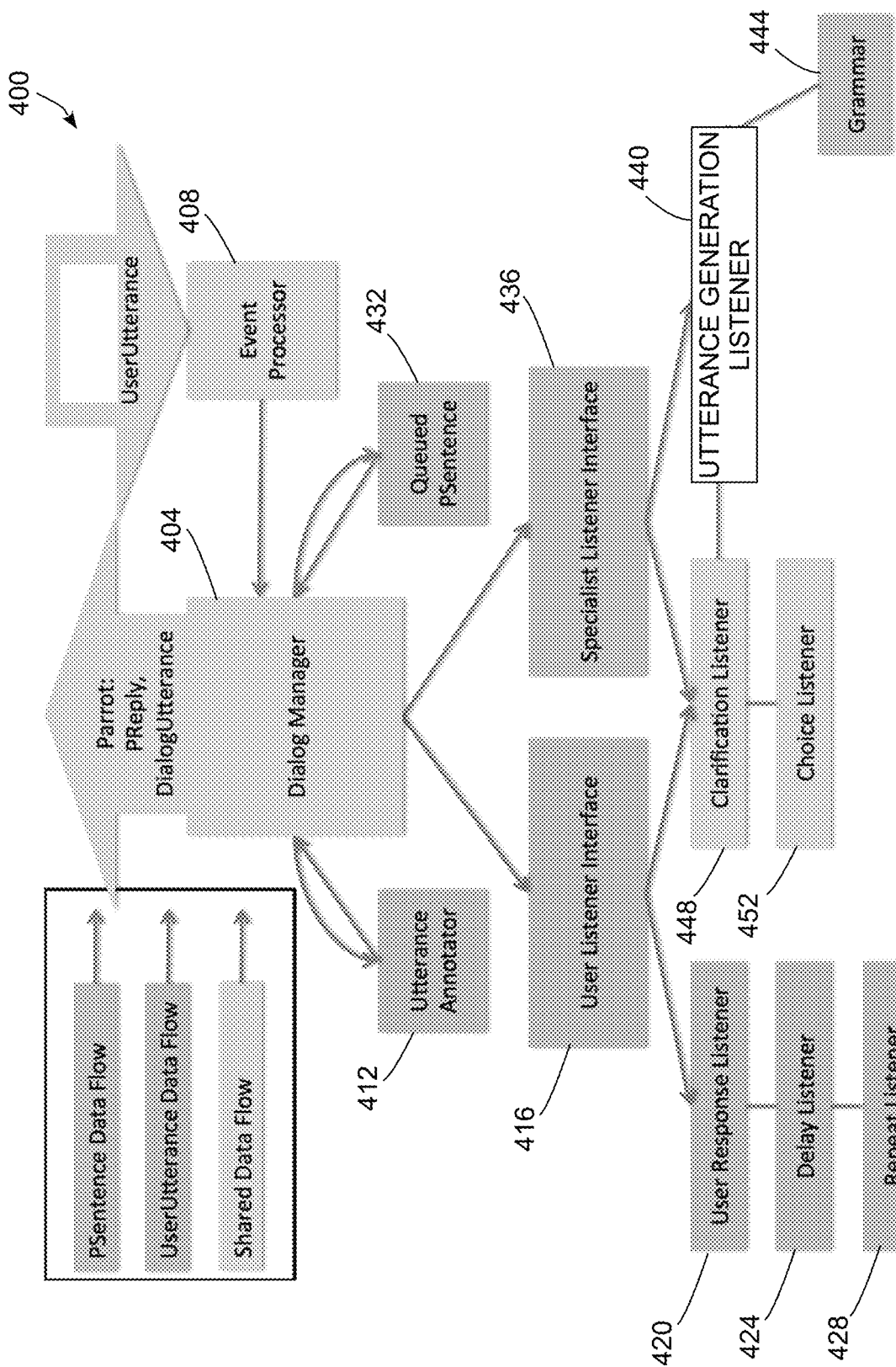
FIG. 4 is a schematic diagram of one embodiment of a software architecture that implements the dialog management system.

FIG. 4 depicts one embodiment of a software architecture 400 that provides functionality to the user interface devices 104A and 104B or another suitable computerized device in the system 100 to implement a speech interface for interaction between the system 100 and the users 102A and 102B. The software architecture 400 includes a dialog manager 404, event processor 408, utterance annotator 412, set of queued natural language sentences ("Psentences") 432, a user listener interface 416, and a specialist listener interface 436.

The dialog manager 404 implements a software service that generates a natural language output, such as a display of natural language text or synthesized speech output, which is based on natural language templates that are stored in the sentence queue 432 (equivalent to the priority queue 336 of FIG. 3). The dialog manager 324 also handles input requests from the user and mediates between a natural language interface that is understandable to a user and the machine-readable formats of the service messages and the command messages that are compatible with the home automation devices 108A-108D. As described in more detail below, the dialog manager 324 also controls the flow of dialog between the user and the user interface device 104 to implement user interface functions such as disambiguation of user input instead of requiring these functions to be implemented in each of the home automation devices 108A-108D. The user interface device 104 implements the dialog manager 404 as a software dialog manager 324. The processor 304 executes the stored program instructions in the memory 320 to perform the functions of the dialog manager 324.

The utterance annotator 412 assigns words in the speech recognition data an annotation from a predetermined a list of annotations (e.g. ACCEPT, REJECT, and COMPLETE). The user listener 416 and associated sub-listeners process the annotations to determine if an utterance includes all of the elements that are necessary to generate a command message for a particular home automation device or if the system 100 needs to generate a further prompt to elicit information from the user.

The event processor 408 receives the initial speech input data, which is also referred to as "utterance data" from the speech recognition engine 328. The dialog manager 404 and the utterance annotator 412 provide further processing to analyze the utterance data and determine if the terms that are included in the utterance data include parameter information that are acceptable for the parameters in command templates to operate the home automation devices 108A-108D in the system 100 or if further clarification from the user is required before a command message can be generated and transmitted to the home automation device. The event processor 408 also receives service messages from the home automation device 108A-108D in the system 100. During operation, the event processor 408 provides the service messages to the dialog manager 404 for generation of natural language outputs when the dialog manager 404 is idle or the event processor 408 places the service message in the priority queue 432 (queue 336 in FIG. 3).

In the architecture 400, the listener interfaces including the user listener interface 416 and the specialist listener interface 436 are modular components within the dialog manager 404 that implement dialog management functions for users based on user preferences (the user listener interface 416) and for the specific dialog patterns of different home automation devices (the specialist listener interface 436). The "listener" interfaces described in the software architecture 400 implement the observer pattern to process utterance data that the dialog manager 404 receives in different contexts based on the expected speech input data for the predetermined structure of different command messages. The User Response Listener 420 listens for ACCEPT, COMPLETE, and REJECT annotations, which are sent back to the Specialist in the form of the appropriate reply template. As described in more detail below, in some configurations the listener interfaces generate multi-state interactive dialogs with the user instead of merely conveying a single message to the user. For example, in many situations the dialog manager 404 uses the appropriate listener to handle the generation of a natural language message based on a specific service message from the event processor 408 where the listener produces a dialogue with one or more natural language prompts. The user provides input, including speech input or touch input in different embodiments, using the input devices 312 to respond to the prompts. During the interaction process, the dialog manager 404 operates in an "active" state in which the processor 304 places additional service messages from the home automation devices 108A-108D in the priority queue 336 to prevent interruption of an ongoing dialog while the dialog manager is in the active state. After completion of a dialog sequence, the dialog manager enters an "idle" state in which the processor 304 can retrieve another service message from the priority queue 336 to begin another dialog sequence. As described in further detail below, the user interface device 104 interrupts ongoing dialogs only upon receipt of a predetermined set of high-priority service messages, such as fire alarms or similar types of alert messages. The user listener interface 416 further implements a user response listener 420, delay listener 424, and repeat listener 428.

The specialist listener interface 436 implements a specific listener for each type of interaction with the user. The specialist response listener interface 436 further implements the utterance generation listener 440 that relies upon a predetermined grammar 444. The utterance generation listener receives one of the selected templates and corresponding parameter data either directly from the dialog manager 404 or from the priority queue 432 and generates a machine readable sentence or phrase that corresponds to a prompt for the user. The grammar 444 is a natural language dictionary that includes candidate words and grammatical structure that the utterance generation listener 440 uses to generate a phrase from a given template. In the user interface device 104, the processor 304 provides the output of the utterance generation listener 444 to the speech synthesis engine 332 to generate a synthesized speech prompt through the audio output device 308 or another form of output device such as a text output via a display device. The user listener interface 416 and the specialist listener interface 436 jointly implement the clarification listener 448 and choice listener 452.

Figure 2:
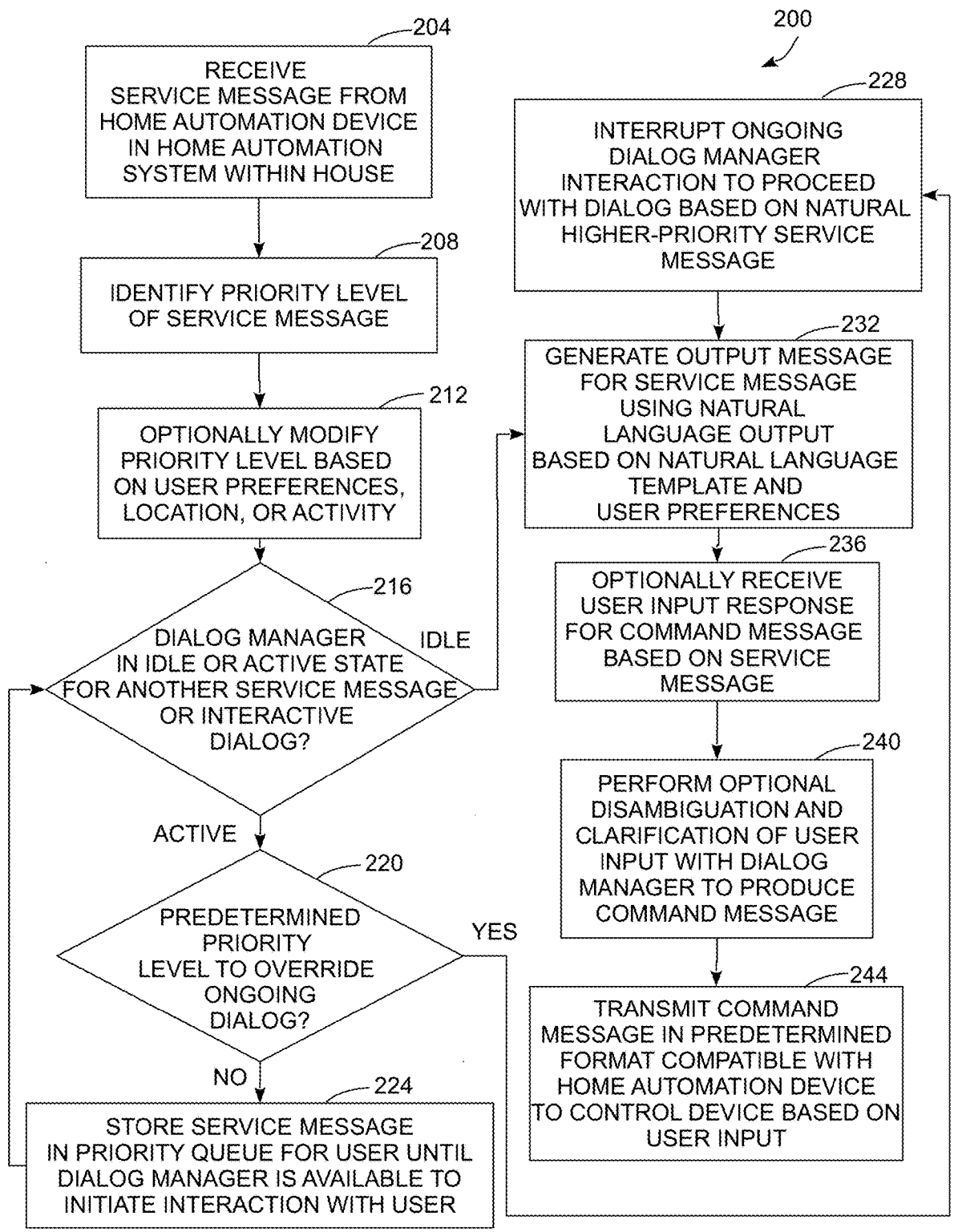
FIG. 2 is a block diagram of a process for prioritized generation of dialog prompts and reception of speech input from a user to control a distributed network of home automation devices.

FIG. 2 depicts a process 200 for the generation of audible prompts and user dialog in a home automation system that uses distributed home automation devices. In the description below, a reference to the process 200 performing a function or action refers to the operation of a processor, such as the processor 304 in the user interface devices 104A and 104B to execute the stored program instructions to implement the functions or actions of the process 200. The process 200 is described in conjunction with the embodiments of FIG. 1, FIG. 3, and FIG. 4 for illustrative purposes.

The process 200 begins as the user interface device receives a service message that is generated by one of the home automation devices 108A-108D (block 204). In the user interface devices 104A and 104B the network interface device 316 receives the service message via the network 112 or through a direct communication from a home automation device. The service message can originate from any of the home automation devices 108A-108D in the house and the service message generation and transmission occurs under the control of the home automation device. In one configuration, the home automation device transmits the service message as a broadcast message to the user interface devices 104A/104B and to any other listening computing device. In another configuration, the home automation device transmits the service message to a specific device that is associated with one user, such as the user interface device 104A for the user 102A or the user interface device 104B for the user 102B.

The process 200 continues as the processor 304 identifies a priority level of the service message (block 208). In one embodiment of the system 100, the processor 304 identifies a a priority level parameter in each service message. The priority level parameter is, for example, an integer value in a predetermined range from a predetermined maximum value to a predetermined minimum value or another range of data values that establish the priority of each service message. In one embodiment, a lower numeric priority number indicates a higher priority with "0" being the ultimate priority level that is reserved for the highest priority messages such as emergency alarms that the system 100 will always convey to the users immediately and the priority level is not otherwise modified based on user preferences or the identified location and activity of the user. Higher numeric values of the priority level parameter indicate reduced priority levels. In another configuration of the system 100, if the service messages do not directly include the priority parameter then the processor 304 identifies predetermined priority level parameters that are associated with each type of service message using the device and service message registration database 344. The processor 304 associates each incoming service message with the priority level based on the device identifier parameter in the service message that identifies the particular home automation device 108A-108D that sent the service message along with the specific type of message. For example, the registration database 344 lower priority level parameter for a temperature status message from the HVAC system 152 and a higher priority level parameter for another service message indicating the need for servicing an air filter in the HVAC system 152.

The process 200 continues as the processor 304 optionally modifies the priority level of the message based on one or more of a set of user preferences, the location of the user, or an identified activity of the user (block 212). During process 200 the processor 304 in each of the user interface devices 104A and 104B tracks the location and activity of the corresponding user. In one embodiment, the processor 304 uses a global positioning system (GPS) or other navigational devices 318 to track the location of the user interface device which is used as a proxy for the location of the corresponding user 102A or 102B since the user interface devices are typically carried with the user. In another embodiment, the processor 304 identifies the location of the user indirectly based on the short-range radio or line of sight optical detection of various home automation devices in the house. For example, the user interface device 104B with user 102B in the room 120C detects the home automation device 108C including the light control device 132 using a short-range wireless transceiver such as a Bluetooth transceiver or a line of sight optical or infrared transceiver. The processor 304 in the user interface device 104B identifies the location of the user 102B as being in the room 120C based on the registered device database 344 that includes location information for the home automation devices 108C. The user interface device 104B similarly fails to detect other home automation devices in the other rooms 120A-120B and 120D of the house using short-range radio or optical transceivers. In still other embodiments, the sensors 110A-110D monitor the locations of different users in the house via, for example, optical or thermal imaging and transmit the user location data to the user interface devices 104A and 104B via the wireless network 112.

The processor optionally 304 increases or decreases the priority level of the service message based on stored preferences for individual users in the user preference data 352, or on the identified location or activity of the user. For example, in one configuration the processor 304 increases the priority level for service messages that are received from home automation devices that are located in the same room as a user, such as service messages from the home automation devices 108A that the user interface device 104A receives while the user 102A is in the room 120A. Similarly, in some configurations the processor 304 decreases the priority level of service messages that are received from home automation devices in other rooms, such as reducing the priority levels of service messages from the home automation devices 108B in the user interface device 104B of the user 102B, who is in a different room (120C) than the location of the home automation devices 108B in room 120B.

Process 200 continues as the processor 304 identifies if the dialog manager 324 is either in the "idle" state in which the dialog manager 324 and the user interface device 104 is not otherwise engaged in a dialog with the user or in the "active" state in which the user interface device 104 is engaged in a dialog with the user for another service message at the time of receiving the service message (block 216).

If the dialog manager is in the active state, then the processor 304 additionally identifies if the priority level of the service message has a predetermined priority level for interruption of the dialog manager in the active state (block 220). For example, a small set of service messages have the highest priority level that enables interruption of ongoing dialog processes in the dialog manager 324 to provide an immediate natural language output for the user. One example of such a service message is a fire or burglar alarm from a home monitoring system. The processor 304 selects the higher-priority service message to interrupt the ongoing activity of the dialog manager 324 (block 228).

If the priority level parameter corresponding to the service message is not the predetermined high priority level to interrupt the active state of the dialog manager 324 (block 220) then the processor 304 adds the service message to the priority queue 336 (block 224). In one embodiment, the processor 304 stores the messages in a prioritized first-in first-out (FIFO) queue where higher priority messages are positioned closer to the front of the queue with service messages that have equal priority levels being arranged with the oldest message of each priority level being arranged nearest to the front of the queue. In a more simplified embodiment, the priority queue 336 is an ordinary FIFO queue that arranges queued service messages based only on the order of arrival of the service messages to the queue. In the process 200, the queued service messages remain in the priority queue 336 until the dialog manager 324 returns to the idle state and the processor 304 retrieves a queued service message to perform the processing that is described in more detail below with reference to blocks 232-244 of the process 200.

If the dialog manager 324 is in the idle state (block 216) or the processor 304 selects the higher priority service message to interrupt an ongoing dialog (block 228), then the process 200 continues as the dialog manager 324 generates a natural language output message based on the service message using one of the output devices (block 232). The processor 304 generates the output message based at least in part on a device identifier parameter in the service message and a plurality of natural language templates stored in the memory. For example, in the user interface device 104 the dialog manager 324 receives the device identifier parameter from the received service message and uses the registration database 344 to identify a natural language template 340 that corresponds to the service message. The processor 304 then uses the context-free grammar in association with the natural language template, parameter data received from the service message, and the user preference data 352 to generate a natural language output message for the user.

In the user interface device 104, the processor 304 executes the stored program instructions for the dialog manager 324 to identify a natural language template that serves as a basis for generation of a message to the user via a text display output, speech synthesized audio output, or another output channel. The natural language templates are also referred to as "sentence templates" since each template corresponds to the grammatical elements that form the structure of a sentence. The context-free grammar associated with the natural language template data 340 enables the dialog manager 324 to generate output messages with variations in the exact wording of the messages based on user preferences. Each output message includes at least one sequence of words that correspond to one or more spoken sentences in a natural language. In the system 100, the language templates are organized into the following categories:

TABLE 1

| Template (PSentence) Type | Required Word Types | OPTIONAL WORD PARAMETERS |
| --- | --- | --- |
| command | Action | object, location, time, reason |
| description | object, adjective | reason |
| recommend | Action | object, location, time, reason |
| Phrase | fullPhrase | |
| materials | Object | location |
| State | Object | time, location, reason |
| systemAction | Action | object, location, time, reason |
| choiceAction | Action | location, time, reason |
| choiceObject | Object | location, time, reason |
| question | Action | object, location, time, reason |

An example of a question template that corresponds to a service message with parameters is presented below for illustrative purposes:

{
  "topic":"PsentenceQuestion",
  "targetUser":[NAME_PARAMETER],
  "dictionaryName":"http://example.com/dictionary/homeAuto",
  "questions": [{

```
        "object: [AUTOMATION_SYSTEM_PARAMETER],
        "action: [ACTION_PARAMETER]
      }],
      "priority":2,
      "stripe":"REQUEST",
}
```

As described above, the template includes a predetermined grammatical structure that user interface device 104A or 104B uses to generate the natural language output. In the user interface device 104, the processor 304 selects a natural language template based at least in part on a device identifier parameter in the service message and the plurality of natural language templates 340 stored in the memory 320. The template presented above includes information about the structure of a natural language "psentence" but does not include the individual words that form the exact output sentence. Instead, the processor 304 and dialog manager 324 use the context-free grammar 340 and stored dictionary data corresponding to the URL for "dictionaryName" to generate the natural language output based on the general grammatical structure of the natural language template, parameter data from the service message, and the user preference data 352. For example, in the template described above the NAME_PARAMETER is the name of the user who receives the message. The NAME_PARAMETER is stored in the user preference data 352, and the dialog manager 324 includes the name of the user in the natural language output message. The processor 304 then generates a natural language output based on the final output sentence. For example, in one embodiment a display screen output device generates a natural language text output for the user or in another embodiment the processor 304 uses the speech synthesis engine 332 and a speaker to generate speech synthesized output.

Some natural language templates include parameters, which correspond to variable elements in a template that change based on the contents of the service message. In the example above, the terms NAME_PARAMETER, AUTOMATION_SYSTEM_PARAMETER, and ACTION_PARAMETER are each examples of parameters in a template that the processor 304 fills with variable data from the service message or another source to serve as a basis for the synthesized speech output. For example, the "NAME_PARAMETER" corresponds to the name of the registered user that is associated with the particular user of the device. The user name parameter is typically stored in the user preference data 352 in the memory 320. The processor 304 extracts other parameter data from the contents of the service message using, for example, a parser and a lexer to extract information from the service message. The service messages from different home automation devices are generated using predetermined message structures that include elements that are amenable to extraction by the processor 304 based on the predetermined formats of different service messages that are stored in the device registration database 344. In the example above, the AUTOMATION_SYSTEM_PARAMETER includes a text identifier or other suitable identifier that specifies the name of the home automation device (e.g. an air purifier) and the ACTION_PARAMETER includes data specifying an operation that the home automation device performs contingent upon a confirmation command message from the user (e.g. activating or deactivating the air purifier).

For example, using the question template that is presented above the processor 304 uses the speech synthesis engine 332 and audio output device 308 to generate the following prompt: "BOB, should I RUN the AIR PURIFIER?" where "BOB", "RUN", and "AIR PURIFIER" are parameters for the question template.

In some embodiments, the user interface devices 104A/104B adjust the specific contents of the speech synthesized prompts based on the user preference data user preference data 352 for different users. For example, in the system 100 the user 102A is a new user to the system 100 while the user 102B is an experienced user. The user interface device 104A generates more verbose audible prompts for the user 102A in response to the service message compared to the prompt that the user interface device 104B generates for the same service message. In one embodiment, the user preference data 352 includes a uniform resource locator (URL) that references a customized set of frame sentences with different arrangements of terms for the same template for different users. Thus, the two different users 102A and 102B of the system 100 that are depicted in FIG. 1 can receive different speech synthesized prompts for the same service message from one of the home automation devices 108A-108D based on the user preference data 352 for the individual users.

During process 200, the user interface devices 104A/104B optionally receive an input response from the user based on a natural language output prompt corresponding to the service message using the input devices 312 (block 236). The additional user input is optional depending upon the content of the service message. For example, the dialog manager 324 generates a natural language output prompt to request a command or additional information from the user for certain types of service message. The user 102A provides a touch input gesture or speech input to the input devices 312 in the user interface device 104A to enter a command or a response to a request prompt from the natural language output of the service message. The processor 304 and dialog manager 324 use the input data from the user to select and populate an appropriate command template 348 for generation of a command message based on the user input.

In some instances, the dialog manager 324 also performs disambiguation and clarification of user input operations prior to generating a command message (block 240). For example, the dialog manager can receive a request to repeat a repeat a speech synthesized output message to the user, and the processor 304 repeats the output message to the user without requiring additional interaction with the automated device that generated the original service message. In other situations, if the speech recognition engine 328 cannot identify words in speech input from the user, the processor 304 prompts the user to repeat the speech input without requiring additional communication with the home automation device that generated the original service message. For example, the processor 304 and the dialog manager 324 can generate a speech synthesized or text output using the output devices 308 to request an additional parameter in the command template for the command message in response to the speech input from the user not including the necessary input for the additional parameter.

Part of the clarification process may include answering requests for information from the user. In some instances, the processor 304 uses the dialog manager 324 to generate command messages that include queries for the additional information from the home automation device, and the processor 304 extracts the information from the response service message as part of the disambiguation process while the dialog manager 324 remains in the active state for interactive dialog with the user.

Process 200 continues as the user interface device 104 transmits the command message to the corresponding home automation device (block 244). For example, in the system 100 the user interface device 104A transmits the command message with an update to a thermostat temperature set point to the HVAC system 152 based on the input from the user 102A and the dialog process that is performed by the dialog manager 324 in the user interface device 104A.

In the system 100, the user interface devices 104A/104B provide a consistent interface for interaction with a wide range of different home automation devices 108A-108D to a user, which greatly simplifies the operation of complex automated "smart" devices in the home. Additionally, the user interface devices consolidate the input and output interfaces and a dialog manager to control the interaction with a large number of home automation devices into a single device for one or more users. Consequently, these complex functions do not have to be integrated into each of the automated devices 108A-108D in the house, which reduces the complexity of the digital processing hardware and software that is required for each of the home automation devices.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for dialog interaction with a user interface in a distributed automation system comprising:
   receiving with a network interface device in a user interface device, a service message from a home automation device in the distributed automation system;
   identifying, with the processor, a state of a dialog manager that the processor executes with stored program instructions stored in a memory of the user interface device in response to receiving the service message;
   generating, with the processor and an output device, a natural language output message based at least in part on a device identifier parameter in the service message and a plurality of natural language templates stored in the memory in response to the dialog manager being in an idle state;
   storing, with the processor, the service message in a priority queue in the memory based on a priority level parameter corresponding to the service message in response to the dialog manager being in an active state
   identifying, with the processor, a first room location of the user interface device;
   identifying, with the processor, a second room location of the home automation device based on the service message; and
   increasing, with the processor, the priority level of the priority level parameter in the service message in response to the first room location and the second room location corresponding to a single room.

2. The method of claim 1 further comprising:
   generating, with the processor and a display device associated with the user interface device, a text output message based on the natural language output message.

3. The method of claim 1 further comprising:
   generating, with the processor and an audio output device associated with the user interface device, a speech synthesized output message based on the natural language output message.

4. The method of claim 1 further comprising:
   identifying, with the processor, a state transition in the dialog manager from the active state to the idle state; and
   generating, with the processor and the output device, another natural language output message based at least in part on a device identifier parameter in a service message stored in the priority queue having a highest priority level and the plurality of natural language templates stored in the memory in response to the state transition of the dialog manager.

5. The method of claim 1 further comprising:
   identifying, with the processor, that the priority level parameter in the service message corresponds to a predetermined priority level for interruption of the dialog manager in the active state; and
   generating, with the processor and the output device, the natural language output message while the dialog manager is in the active state in response to the priority level parameter in the service message corresponding to the predetermined priority level.

6. The method of claim 1 further comprising:
   receiving, with an audio input device associated with the user interface device, speech input from the user in response to the natural language output message;
   identifying, with the processor and the dialog manager, at least one parameter in the speech input that corresponds to a predetermined command template stored in the memory in association with the device identifier parameter of the home automation device that produced the service message;
   generating, with the processor and the dialog manager, a command message based on the at least one parameter and the predetermined command template; and
   transmitting, with the network interface device, the command message to the home automation device to control operation of the home automation device based on the speech input from the user.

7. The method of claim 6 further comprising:
   generating, with the processor, the dialog manager, and the output device, an output request for an additional parameter in the predetermined command template for the command message in response to the speech input from the user not including the additional parameter.

8. The method of claim 1 further comprising:
   decreasing, with the processor, the priority level of the of the priority level parameter in the service message in response to the first room location and the second room location corresponding to different rooms.

9. A user interface device in a distributed automation system comprising:
   a network interface device configured to receive service messages from a plurality of home automation devices;
   an output device;
   a memory; and
   a processor operatively connected to the network interface device, the output device, and the memory, the processor being configured to:
      receive a service message from a home automation device in the distributed automation system with the network interface device;
      identify a state of a dialog manager that the processor executes with stored program instructions stored in the memory of the user interface device in response to receiving the service message;

generate a natural language output message based at least in part on a device identifier parameter in the service message and a plurality of natural language templates stored in the memory in response to the dialog manager being in an idle state with the output device;

store the service message in a priority queue in the memory based on a priority level parameter corresponding to the service message in response to the dialog manager being in an active state;

identify a first room location of the user interface device;

identify a second room location of the home automation device based on the service message; and increase the priority level of the priority level parameter in the service message in response to the first room location and the second room location corresponding to a single room.

10. The user interface device of claim 9, wherein the output device is a display device, the processor being further configured to:

generate a text output message based on the natural language output message with the display device.

11. The user interface device of claim 9, wherein the output device is an audio output device, the processor being further configured to:

generate a speech synthesized output message based on the natural language output message with the audio output device.

12. The user interface device of claim 9, the processor being further configured to:

identify a state transition in the dialog manager from the active state to the idle state; and generate another natural language output message with the output device based at least in part on a device identifier parameter in a service message stored in the priority queue having a highest priority level and the plurality of natural language templates stored in the memory in response to the state transition of the dialog manager.

13. The user interface device of claim 9, the processor being further configured to:

identify that the priority level parameter in the service message corresponds to a predetermined priority level for interruption of the dialog manager in the active state; and generate the natural language output message with the output device while the dialog manager is in the active state in response to the priority level parameter in the service message corresponding to the predetermined priority level.

14. The user interface device of claim 9 further comprising:

an audio input device; and the processor being operatively connected to the audio input device and further configured to:

receive speech input from the user with the audio input device in response to the natural language output message;

identify at least one parameter in the speech input that corresponds to a predetermined command template stored in the memory in association with the device identifier parameter of the home automation device that produced the service message;

generate a command message with the dialog manager based on the at least one parameter and the predetermined command template; and transmit the command message to the home automation device with the network interface device to control operation of the home automation device based on the speech input from the user.

15. The user interface device of claim 14, the processor being further configured to:

generate an output request for an additional parameter in the predetermined command template for the command message with the dialog manager and the output device in response to the speech input from the user not including the additional parameter.

16. The user interface device of claim 9, the processor being further configured to:

decrease the priority level of the of the priority level parameter in the service message in response to the first room location and the second room location corresponding to different rooms.

* * * * *